Figure 1:
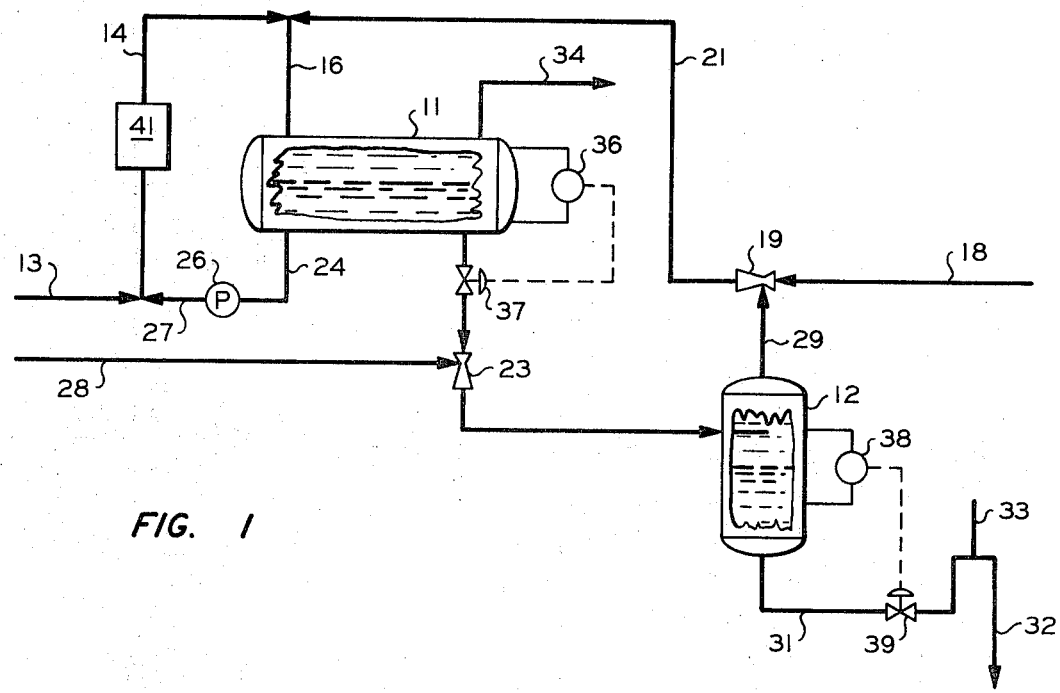

United States Patent

[11] 3,542,196

[72] Inventor Stuart E. Madlung, Jr.
 Martinez, California
[21] Appl. No. 694,947
[22] Filed Jan. 2, 1968
[45] Patented Nov. 24, 1970
[73] Assignee Phillips Petroleum Company,
 a corporation of Delaware

[54] LIQUID SEPARATION
 1 Claim, 2 Drawing Figs.
[52] U.S. Cl. .................................................. 210/71,
 210/73, 210/84; 55/45
[51] Int. Cl. .................................................. B01d 17/04
[50] Field of Search ........................................... 210/21, 22,
 71—73, 83, 84; 55/45, 46, 48, 50, 51, 54, 55

[56] References Cited
UNITED STATES PATENTS

| | | | |
|---|---|---|---|
| 1,611,256 | 12/1926 | Suczek .......................... | 55/50X |
| 2,307,078 | 1/1943 | Reed ............................ | 210/21X |
| 2,588,794 | 3/1952 | Barton .......................... | 210/21 |
| 3,217,466 | 11/1965 | Bogart .......................... | 55/54X |

*Primary Examiner*—John W. Adee
*Attorney*—Young & Quigg

ABSTRACT: In a liquid separation system comprising phase separation followed by a vacuum flash of one of the separated components, the vacuum is produced by pumping one of the liquids through an eductor prior to introduction into the phase separation zone.

Patented Nov. 24, 1970 3,542,196

INVENTOR.
S. E. MADLUNG, JR.
BY
*Young & Quigg*
ATTORNEYS

LIQUID SEPARATION

This invention relates to liquid separation. In one aspect, it relates to a method for separating liquids and removing by flash vaporization small quantities of a lower boiling liquid entrained in a higher boiling liquid.

Often when two substantially immiscible liquids are separated by phase separation, a very small quantity of one is dissolved and/or entrained in the other. In many instances such small quantities are not harmful and can be permitted to remain. However, in other instances, even trace quantities of one of those liquids must be removed from the other. This occurs, for example, when one of the liquids cannot be tolerated in a further chemical reaction occurring with the other of the liquids, or when the one liquid cannot be tolerated in the disposal of the other. An example of the latter occurs in the operation of oil refineries wherein hydrocarbon streams are water washed, with the spent wash solution being dumped continuously to a disposal system. The water sometimes contains sufficient amounts of hydrocarbon to be wasteful in the loss of hydrocarbons and to contribute to water and air pollution problems.

An object of the invention is to separate liquids. Another object of the invention is to provide for the removal of trace quantities of one liquid from another following a phase separation. Another object of the invention is to operate economically a separation system comprising phase separation followed by a vacuum flash.

Other aspects, objects and the advantages of the invention are apparent in the written description, the drawing and the claims.

According to the invention the vacuum for a vacuum flash following a liquid phase separation is provided by pumping one of the liquids being fed to the phase separation zone to an eductor to withdraw flash vapors from the flash zone. In the flash zone small quantities of lower boiling components of one of the liquids are removed from the phase separated stream comprising the other liquid. The vacuum is provided by pumping through the eductor either one of the liquids being fed to the phase separation zone or a mixture of the two. The lower boiling liquid or the liquid comprising lower boiling components can be less or more dense than the other liquid stream and, therefore, the separated phase being passed to the flash separation zone can be either the upper or lower of the phases in the phase separation zone.

In the drawing, FIG. 1 is a schematic illustration of one form of separation and flash system.

Figure 2:
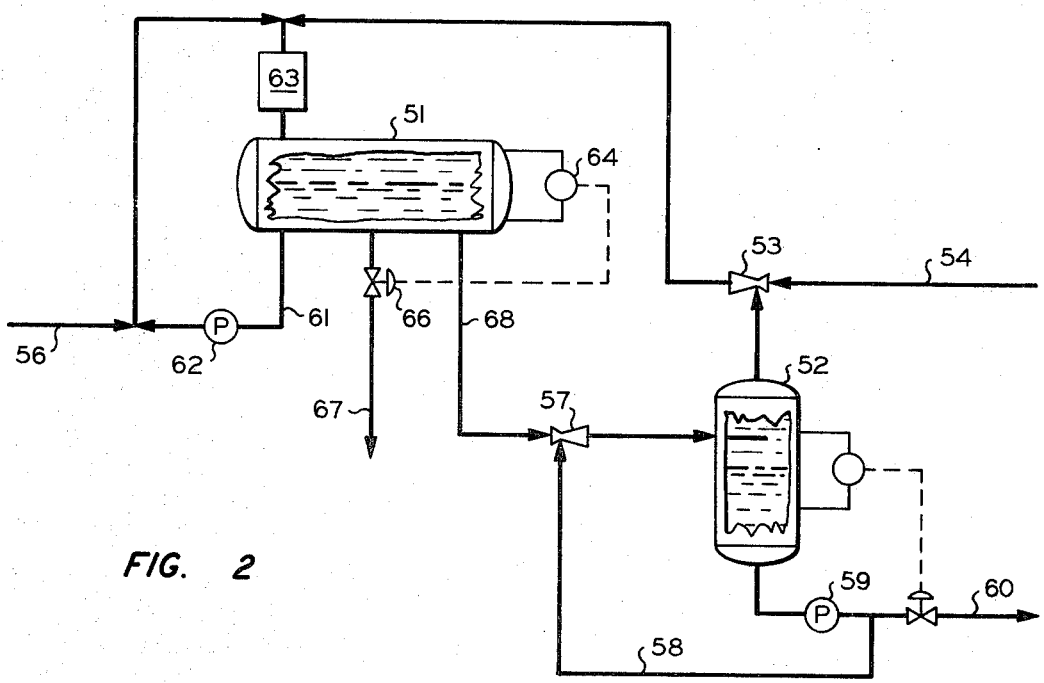

FIG. 2 is a schematic illustration of a phase separation and flash system wherein the lower density liquid is the higher boiling.

In the system illustrated in FIG. 1, there are provided a phase separation tank 11, and a flash tank 12. Oil having a water soluble impurity, for example, residue from a caustic wash, enters through pipe 13 and is passed through pipe 14 and pipe 16 into tank 11. Make-up water passes through pipe 18, eductor 19, pipe 21 and pipe 16 into tank 11. Water is withdrawn from tank 11 through eductor 23 to tank 12, and through pipe 24, pump 26, pipe 27, pipe 14 and pipe 16 to tank 11. Steam enters through pipe 28 into eductor 23. Vapor is withdrawn from the top of tank 12 through pipe 29 to eductor 19 and is introduced into the water being fed through pipe 21 and pipe 16 to tank 11. Water is removed from the bottom of tank 12 through pipe 31, which can be long enough to serve as a water leg, and through pipe 32 to the sewer. Vent 33 is provided if desired or necessary. If desired, a pump can be provided instead of a water leg. Oil is removed from tank 11 through pipe 34. A liquid level controller 36 adjusts valve 37 to maintain the withdrawal of water at the desired rate to maintain the level of the interface in tank 11 in a desired range. Similarly, liquid level controller 38 controls valve 39 and the withdrawal of water from tank 12 to maintain the desired water level therein.

If desired, mixing means 41 is provided. This can be one or more orifices or valves, a conduit having a tortuous flow path, etc. If desired, the oil can be introduced into pipe 24, thereby utilizing pump 26 for mixing.

In operation, oil containing a small amount of residual aqueous caustic (NaOH) is mixed with water and introduced into tank 11. The water removes substantially all of the caustic from the oil. Although the water and oil are substantially immiscible, a small quantity of oil is dissolved in the water and a small quantity of water is carried with the oil. The small amount of water leaving with the oil through pipe 34 is not necessarily harmful or wasteful and can be removed in downstream separation zones if necessary. On the other hand, oil leaving with the water through pipe 22 is highly undesirable, both from the standpoint of waste of hydrocarbon products and from the standpoint of water and/or air pollution, depending upon the ultimate method of disposal. Therefore, the water is passed through flash zone 12, where substantially all of the oil is vaporized through the addition of heat by the steam coming in through pipe 28 and by the vacuum which is provided by eductor 19, powered by the make-up water entering through pipe 18. The vapor thus removed is returned to tank 11 and eventually removed through pipe 34, since the concentration of the oil in the water being removed from tank 11 remains substantially constant.

In the system illustrated in FIG. 2, the oil, e.g., such as kerosene, although less dense than water, is higher boiling and it is necessary to remove trace amounts of water from the oil and trace amounts of oil can be tolerated in the water or the oil can be removed by other means, such as by treating with an adsorbent, e.g. polyethylene fluff. The adsorbed oil can be recovered if desired. In this system, there are provided an phase separation tank 51 and flash separation tank 52 similar to tanks 11 and 12 of FIG. 1, respectively. However, in this system, the oil is withdrawn from tank 51 to tank 52 from which the lower boiling water is removed through eductor 53 and returned to tank 51. Although eductor 53 is shown as powered by oil entering the system through pipe 54, alternatively it could be powered by water which is shown as entering through pipe 56. That is to say, the make-up water could be passed through eductor 53 on its way to tank 51. An eductor 57 is shown with a recycle line 58 on flash tank 52. Depending upon the pressure available, it is possible that eductor 57 could be powered by the oil from tank F. rather than the recycle in pipe 58 whereby pump 59 would not necessary. The system is also operable without the recycle line 58. Other aspects of the system are similar to the system of FIG. 1. For example, water is recycled through pipe 61 and pump 62 to tank 51. A mixing section is provided if desired or necessary. Liquid level controller 64 operates to maintain the level of the interface in tank 51. With the withdrawal of the oil above the interface, it will be seen that this controller decreases the flow of water through valve 66 in water line 67 as the interface lowers increases the flow as the interface rises above the desired level.

Heat can be provided if desired by indirectly heating line 58, or line 68, through which oil flows to tank 52, or by other means.

Oil which is substantially completely water-free is recovered as product by way of line 60.

In an example according to the invention, in a system as illustrated in FIG. 1, vessel 11 is operated at a pressure of 180 p.s.i.a. and a temperature of 80°F. and vessel 12 at 8 p.s.i.a. and 100°F. Make-up water enters through pipes 17 and 18 at 400 p.s.i.a. and 80°F. at a rate of 150 barrels per hour. Steam enters through pipe 28 at 40 p.s.i.a. and 267°F. at the rate of 3,000 pounds per hour. The hydrocarbon feed brought in through pipe 13 is an alkylate yield from a sulfuric acid alkylation unit, which alkylate yield has been neutralized with caustic. The specific gravity of this alkylate yield at 60°F. is 0.6. The boiling range is −43 to 400°F. and it contains a trace of aqueous caustic (NaOH) solution. The stream enters at a rate of 1,700 barrels per hour. The hydrocarbon product is removed through pipe 34 and passed to a deisobutanizer for further processing. The table presents a material balance on the materials at various points in the system, the numbers at the heads of the columns referring to types of FIG. 1.

training steam therein and then introducing said water phase containing steam into a reduced pressure zone;

TABLE

| Stream component | Steam 28 | Used wash water 22 | Make-up water 18 | Flashed vapors 29 | Flashed residue 31 | Recycle to washer 21 | Caustic-washed alkylate feed 13 | Washed alkylate 34 | Recycle wash 24 |
|---|---|---|---|---|---|---|---|---|---|
| B/H, hydrocarbon | | 0.20 | | 0.2 [a] | Nil | 0.2 | 1,700 | 1,700 | 0.76 |
| 40 lbs. steam, pounds/hr | 3,000 [c] | | | | | | | | |
| Water, as indicated | | 150 B/H | 150 B/H | 1.67 #/hr [a] | 158.6 B/H [b] | 150 B/H [d] | | Trace [e] | 570 B/H |
| Caustic solution | | Trace | | | Trace | | Trace | Nil | Trace |

[a] As vapor.
[b] Includes steam condensate (1.67 #/hr.=0.00475 B/hr.).
[c] 3,000 lbs. steam make 8.57 bbl. H₂O liquid.
[d] Includes 1.67 #/hr. water vapor as condensate.
[e] Containing trace water in solution.

NOTE.—B/H=barrels/hour; #/hr.=pounds/hour.

Reasonable variation and modification are possible within the scope of the invention which sets forth a system for phase separation followed by vacuum flash of one of the separator components.

I claim:
1. A method of removal of a nonvolatile water soluble impurity from a hydrocarbon comprising the steps of:
   a. admixing water and a hydrocarbon containing a nonvolatile water soluble impurity;
   b. passing the resulting mixture into a phase separation zone wherein are formed a liquid hydrocarbon phase lean in said impurity and a liquid water phase containing said impurity and a small quantity of said hydrocarbon;
   c. removing said water phase from said phase separation zone;
   d. pumping said water phase through a first eductor and entraining steam therein and then introducing said water phase containing steam into a reduced pressure zone;
   e. vaporizing said small quantity of hydrocarbon in said reduced pressure zone;
   f. removing from said reduced pressure zone said water phase as liquid substantially free of said small quantity of hydrocarbon but containing said impurity;
   g. pumping make-up water into said separation zone through a second eductor which produces the reduced pressure in said reduced pressure zone;
   h. removing said small quantity of hydrocarbon and at least a portion of said steam from said reduced pressure zone through said second eductor;
   i. introducing said small quantity of hydrocarbon and said portion of said steam along with said make-up water into said phase separation zone; and
   j. recovering from said separation zone said hydrocarbon phase substantially free of said impurity.